US005668944A

United States Patent [19]
Berry

[11] Patent Number: 5,668,944
[45] Date of Patent: Sep. 16, 1997

[54] METHOD AND SYSTEM FOR PROVIDING PERFORMANCE DIAGNOSIS OF A COMPUTER SYSTEM

[75] Inventor: Robert Francis Berry, Austin, Tex.

[73] Assignee: International Business Machines Corporation, Armonk, N.Y.

[21] Appl. No.: 301,089

[22] Filed: Sep. 6, 1994

[51] Int. Cl.$^6$ .................... G01R 31/28; G06F 11/00
[52] U.S. Cl. .................................................. 395/184.01
[58] Field of Search ........................... 395/575, 184.01

[56] References Cited

U.S. PATENT DOCUMENTS

| 4,121,287 | 10/1978 | Leal | 364/461 |
|---|---|---|---|
| 4,471,348 | 9/1984 | London | 340/722 |
| 4,697,127 | 9/1987 | Stich et al. | 318/561 |
| 4,835,699 | 5/1989 | Mallard | 364/470 |
| 4,937,743 | 6/1990 | Rassman | 364/401 |
| 5,062,055 | 10/1991 | Chinnaswamy | 364/513 |
| 5,159,685 | 10/1992 | Kung | 395/575 |
| 5,251,152 | 10/1993 | Notess | 364/550 |
| 5,311,562 | 5/1994 | Palusamy | 376/215 |
| 5,325,505 | 6/1994 | Hoffecker | 395/425 |
| 5,511,191 | 4/1996 | de Leeuw van Weenen | 395/184.01 X |

OTHER PUBLICATIONS

Doraiswami, R., "An expert system for monitoring the status of control systems", Jul. 1991, pp. 457–462, Piscataway, NJ U.S.A.

Choy, M., Singh, A. "Adaptive solutions to the mutual exclusion problem:", 1993, Abstract, New York, New York U.S.A.

*Primary Examiner*—Glenn Snyder
*Attorney, Agent, or Firm*—Benman Collins & Sawyer; Mark S. Walker

[57] ABSTRACT

A performance diagnosis system (PDS) is utilized to analyze, diagnose and provide reports concerning the operation of a computer system. The PDS includes a system model database that contains historical and configuration information which is received on a periodic basis from resource managers within the computer system. The information is updated on a regular basis by individual collectors which are coupled to the resource managers. A reporter receives the historical and configuration information from the database to provide reports on different aspects of the performance of the computer system. In addition, different types of assessments of performance of the computer system is provided by the PDS.

15 Claims, 14 Drawing Sheets

METHOD AND SYSTEM FOR PROVIDING PERFORMANCE DIAGNOSIS OF A COMPUTER SYSTEM

FIELD OF THE INVENTION

The present invention relates generally to diagnosing the performance of a computer system and more particularly to the detection of existing and imminent performance problems.

BACKGROUND OF THE INVENTION

Operating systems associated with computers sometimes fail to deliver the expected level of performance. There are many reasons for the performance level not being at the expected level. Some reasons for the performance problems are changes in workload, the occurrence of hardware or software errors, under-configuration (e.g., too little memory), configuration errors, lack of tuning, and over-commitment of resources. Addressing these problems requires first that they be detected (or anticipated, if possible); then that the reasons for their occurrence be identified; next, steps are taken to remedy the situation, and finally, the fix must be verified.

Detection of performance problems is difficult. The relevant data is not centrally available in many computer systems such as UNIX systems or the like. Further, the interpretation of that data often requires expertise not commonly associated with system administration. However, identifying performance problems is important, for their presence diminishes a customer's investment in a computer system by robbing the customer of purchased resources.

Performance and configuration data are required to effectively diagnose the performance of the computer system. This data is typically available on a computer system from a large number of sources. Typically in a UNIX computer system, the data is provided in many different types of formats.

In order to obtain this diagnostic information, the diagnostic system must be able to collect the data from the resource manager regardless of the format. Accordingly, additional complexity must be built into each of the data sources to provide for integrated (seamless) access to each of the different formats that could be provided. This additional complexity can considerably increase the cost when providing performance diagnosis and consequently, the overall system.

In addition, it is also important to determine the performance level trends, that is whether the performance level is starting to degrade or the like. Trend detection and analysis for performance related characteristics is an integral part of management of the computer system. Oftentimes this is accomplished through manual methods which can be unreliable.

Accordingly, what is needed is a system and method that provides for the diagnosis of the performance level of a computer system that provides for access to data in different formats without adding to the complexity of the sources of data within the computer systems. In addition, what is needed is an automatic system and method for detecting the trend of the performance level of the computer system without adding significant cost and complexity of the system. The present invention addresses such a need.

SUMMARY OF THE INVENTION

A performance diagnosis system (PDS) for providing an indication of the performance of a computer system is provided. The PDS comprises a plurality of data collector means. Each of the data collectors is coupled to one of a plurality of resource managers within the computer system for receiving data therefrom. The PDS also includes a database coupled to the plurality of data collectors for providing historical information responsive to the received data. The database includes an application program interface (API) for providing the information in a standard format. The PDS further includes a reporter responsive to the historical information for providing a report of the performance of the computer.

DETAILED DESCRIPTION

The present invention relates to an improvement in detecting problems with the performance of an operating system of a computer system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
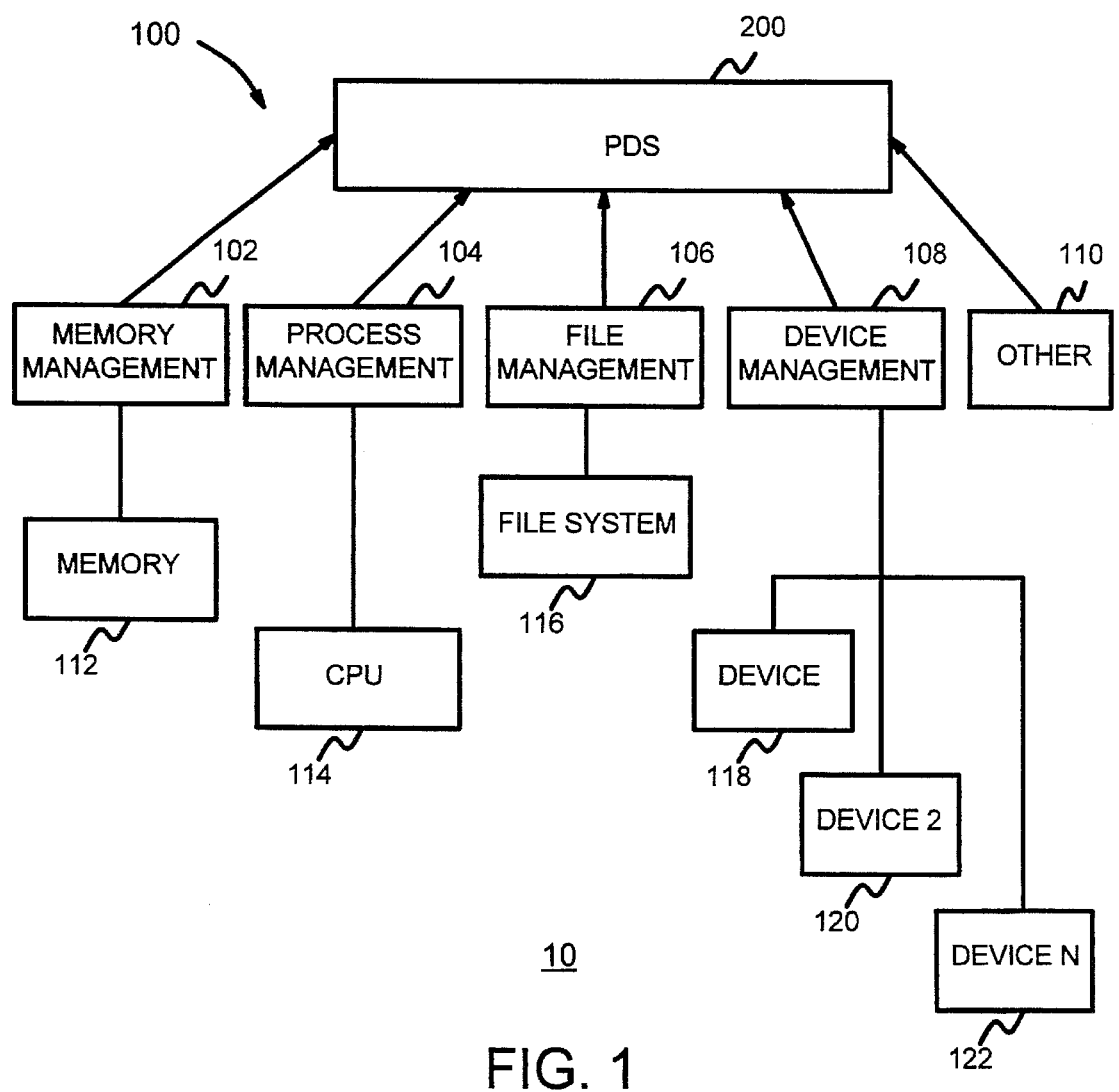
FIG. 1 is a block diagram of a computer system including a performance diagnostic system (PDS) in accordance with the present invention.

Referring now to FIG. 1 what is shown is a computer system 10 which comprises an operating system 100. The operating system comprises a plurality of resource managers 102, 104, 106, 108 and 110. Each of the resource managers 102–110 controls the resource with which it is associated. Therefore, as is seen in this embodiment, the memory manager 102 controls the allocation memory 112, the process manager 104 controls the use and allocation of a central processing unit (CPU) 114, the file manager 106 controls a file system 116 and the device manager 108 controls a plurality of devices 118. It should be understood that the above-described resource managers 102–110 of the operating system 100 are illustrative of the types of resource managers that are present in a computer. Accordingly, one of ordinary skill in the art readily recognizes that other resource managers could be part of the operating system and their use would be within the spirit and scope of the present invention.

Figure 2:
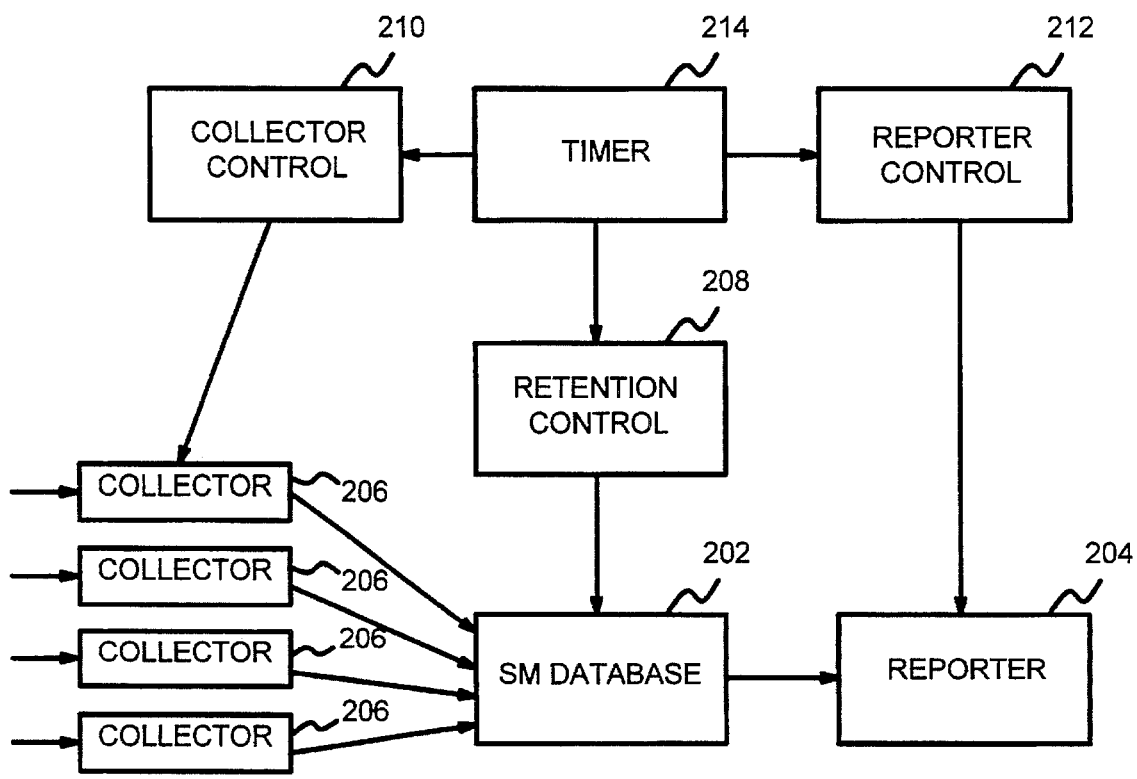
FIG. 2 is a detailed block diagram of the PDS in accordance with the present invention.

A performance diagnosis system (PDS) 200 in accordance with the present invention is coupled to the resource managers 102–110 of the operating system 100. The PDS 200 is utilized to detect and report the presence of undesirable performance characteristics of an operating system of a computer. In addition, the PDS 200 is capable of performing a preliminary diagnosis. To specifically describe operation of PDS 200 refer now to FIG. 2 which is a more detailed block diagram of the PDS 200.

In this embodiment, the PDS 200 includes a system model (SM) database 202. The SM database 202 comprises a historical database of performance and configuration information from the resource managers 102–110 (FIG. 1). All reports are produced from data in the SM database 202 via a reporter 204. A plurality of collectors 206 periodically updates the SM database 202 with new records. Periodically, a retention control unit 208 is activated that determines which of the records in the SM database 202 are to be kept, and which are to be removed. In one embodiment, there is no archival of records that are removed (however, a backup copy of the SM database 202 file is made prior to the running of the retention control unit 208). But in a preferred embodiment, it is conceivable archival records will be kept. Also periodically, the reporter 204 produces the current report. The last report is renamed (as a simple 'backup' measure) when the current report is produced.

All periodic activities are governed by the retention control unit 208, collector control unit 210 and reporter control unit 212 that are, in turn, driven by entries in a timer table 214 for user administration. The collectors 206 use an application program interface (API) associated with the SM database 202 for inserting SM records into the SM database 202. The reporter uses the API to query the SM database 202. The retention control unit 208 removes old information from the database. The SM database 202 in one preferred embodiment is a simple flat file that can be written to, read from, and rewritten. In a preferred embodiment, the SM database 202 would incorporate a complete database.

The PDS 200 is utilized to provide reports that will help identify and analyze performance problems in a computer system. Through the cooperation of the various elements of the PDS 200, it can detect and report undesirable performance characteristics and can also provide a preliminary diagnosis of the detected problems. To more particularly describe the operation of the PDS 200 the operation of the various elements will be described herein below.

SM Database 202

SM database 202 contains historical performance and configuration information collected from the resource managers. Access to SM database 202 is through an application programming interface (SM API) 203. A database SM 202 and the SM API 203 cooperate in the following manner to provide access.

Additions: records are added by calling SM_ADD (record). (PDS 200 actually appends new records onto the SM database 202.)

Deletions: records are deleted by calling SM_DELETE (record). (PDS 200 deletes records through the retention control unit 208. Records are tagged for deletion based on their timestamps.)

Queries: the contents of SM are interrogated through the SM_QUERY call.

```
SM_QUERY(
    return,
    type_pattern,
    object_id_pattern,
    attribute_name_pattern,
    date_pattern)
where
    return - a return structure of N SM records
    type_pattern - a string indicating an explicit
        type name, OR
        a pattern, OR
        $ALL
    object_id_pattern - a string indicating an
```

-continued

```
        explicit id name, OR
        a pattern, OR
        $ALL
    attribute_name_pattern - a string indicating an
        explicit attribute id, OR
        a pattern, OR
        $ALL
    date_pattern - an explicit timestamp structure, OR
        $LAST, OR
        $ALL
```

SM record structure, type names, object ids, attribute ids and timestamps are discussed below.

Each SM_Query returns a structure (a list) of SM records matching the pattern. The structure of the SM, and the SM_Query api provide considerable flexibility. For example, A query for the most recent sizes of all file systems:

SM_QUERY(return,FS,$ALL,size,$LAST)

A query for all historical values for the file system hd0 [suitable for trend analysis, e.g.]:

SM_QUERY(return,FS,hd0,size,$ALL)

A query for all delay measures (regardless of object):

SM_QUERY(return,$ALL,$ALL,delay,$LAST).

In a preferred embodiment, all entries in the SM database have the same basic format. A typical format for a UNIX-based system is shown below for illustrative purpose.

```
type  object_id  hour  day_of_week  week_of_year
month_of_year  year  julian_day  attribute_value  version
collection_attributes
``` where:

1. type=type of object for which data is recorded. There are several base types reflected in the database, including:
    PS—page space
    PV—physical volume
    FN—file name
    FS—file system
    SYS—system
    ERR—a type of error
    PROCESS—a process
    WORKLOAD—a workload
    HOST—a host on a network
2. object_id=the object id. This is a unique string (within any particular type) that identifies the object of interest.
3. hour day_of_week week_of_year month_of_year year julian_day: these are components of the timestamp.
4. attribute_id: name of the attribute that this data represents, e.g., for an FS object, there will be several attributes, including:
    size—size of a file system
    percent—percent full for a file system
    mount—mount point for the file system (string)
    type—type of file system (e.g., afs, jfs)
5. attribute_value: the value associated with this attribute. This is the 'actual' data that is recorded in this record. For example, if the type is 'FS', the attribute_id is 'type', then the attribute_value might be 'jfs'.

6. version: an integer indicating the version number of this record. This is intended to allow for applications consuming data from the SM to be sensitive to changes in record format from version to version of the PDS 200 implementations.

7. collection_attributes: This field describes additional information about the attribute_value. In particular, whether the attribute_value is a text string, a boolean value, or a number. Further, if it is numeric, then information about how it was collected (e.g., how many samples) and its units are also recorded. The values are:
I (duration, gap, N, units)—interval average based on N samples/intervals each covering the given duration and separated from the next by the given gap. (All in seconds).

The SM 202 within the PDS 200 records many different types of information. These types are described as units. For example, units can be:
N—number
pct—a percent
PPS—number of physical partitions
DISKS—number of disks
KBPS—kilobytes per second
S—seconds
KB—kilobytes
PAGES—pages
PROCS—processes
MBUFS—message buffers
MS—milliseconds
ratio—a ratio
T—a textual attribute (string)
B—a boolean (true or false string)

In one embodiment in which SM database 202 is on a flat file, each entry is on a single record, terminated with an end of line (\n). Entries are recorded in time-stamp order.

Collectors 206

Figure 3:
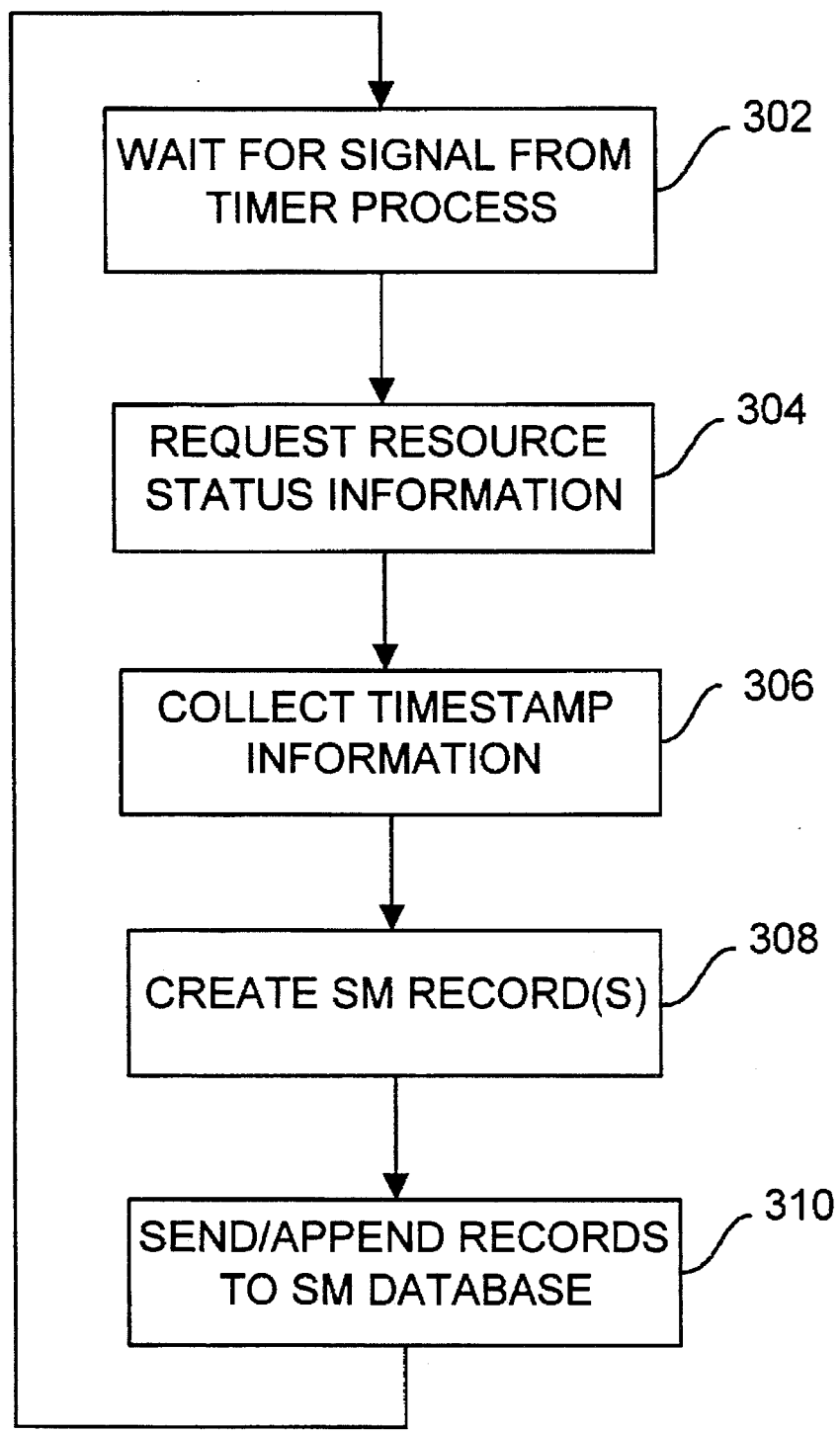
FIG. 3 is a flow chart of the operation of a collector of the PDS of FIG. 2.

Collectors 206 are programs that obtain certain types of data and produce specific SM records. To more particularly describe the operation of an individual collector 206 refer now to the flow chart of FIG. 3. As is seen, initially, the collector 206 receives a signal from timer 214 via step 302. Thereafter the collector 206 will request resource status information from each of the resource managers 102–110 application program interface (RM API) via step 304. Thereafter timestamp information is collected via step 306. A SM record is then created via step 308. Finally the collector 206 sends or appends these records to the SM database 202 via step 310.

Each collector 206 can have a different collection frequency. For each collector 206 one or more RM APIs are called. Listed below for illustrative purposes are a number a different types of collectors for a UNIX based system together with the types of SM records they produce, the RM API(s) that is invoked, and some illustrative examples.

1. Collector: fn.sh produces the following SM records:

FN <file name> size invokes the following RM APIs:

date du-sk <file name>

Examples

FN /usr/adm/wtmp 09 1 29 07 1994 199 size 4 1 I(0,0,1,KB) FN /var/spool/qdaemon 09 1 29 07 1994 199 size 4 1 I(0,0,1,KB)

2. collector: fs.sh produces the following SM records:

FS <file system name> status

FS <file system name> mount

FS <file system name> size

FS <file system name> percent

FS <file system name> type invokes the following RM APIs:

date df mount

Examples

FS hd4 09 1 29 07 1994 199 size 40960 1 I(0,0,1,KB)

FS hd4 09 1 29 07 1994 199 percent 33 1 I(0,0,1,pct)

FS hd4 09 1 29 07 1994 199 mount/1 T

FS hd4 09 1 29 07 1994 199 status avail 1 T

FS hd4 09 1 29 07 1994 199 type jfs 1 T 3. collector: pv.sh produces the following SM records:

PV <physical volume> type

CU <control unit> disks

CU <control unit> sdisks

PV <physical volume> locCU

PV <physical volume> pctavail

PV <physical volume> stgavail

PV <physical volume> util

PV <physical volume> kbps invokes the following RM APIs:

date lscfg lspv

Iostat –d 2 20

Examples

PV hdisk0 09 1 29 07 1994 199 type SCSI 1 T

PV hdisk1 09 1 29 07 1994 199 type SCSI 1 T

CU scsi0 09 1 29 07 1994 199 ndisks 4 1 I(0,0,1,DISKS)

CU scsi0 09 1 29 07 1994 199 sdisks 2140 I(0,0,1,MB)

PV hdisk0 09 1 29 07 1994 199 locCU scsi0 1 T

PV hdisk1 09 1 29 07 1994 199 locCU scsi0 1 T

PV hdisk0 09 1 29 07 1994 199 pctavail 0 1 I(0,0,1,pct)

PV hdisk0 09 1 29 07 1994 199 stgavail 0 1 I(0,0,1,MB)

PV hdisk1 09 1 29 07 1994 199 pctavail 54.0881 1 I(0,0,1,pct)

PV hdisk1 09 1 29 07 1994 199 stgavail 334 0 1 I(0,0,1,MB)

PV hdisk0 09 1 29 07 1994 199 util 24. 6316 1 I(2,2,20,pct)

PV hdisk0 09 1 29 07 1994 199 kbps 10.7895 1 I(2,2,20,KBPS)

PV hdisk1 09 1 29 07 1994 199 util 2 1 I(2,2,20,pct)

PV hdisk1 09 1 29 07 1994 199 kbps 1. 21053 1 I(2,2,20,KBPS)

4. collector: mem.sh produces the following SM records:

SYS sys0 memsize

SYS sys0 mbuf invokes the following RM APIs:

date lscfg memstat −m

Examples

SYS sys0 09 1 29 07 1994 199 memsize 64 1 I(0,0,1,MB)

SYS sys0 09 1 29 07 1994 199 mbuf 30 1 I(0,0,1,MBUFS)

5. collector: err.sh produces the following SM records:

ERR H count

ERR S count invokes the following RM APIs:

date errpt −d H errpt −d S

Examples

ERR H 09 1 29 07 1994 199 count 4 1 I(0,0,1,N)

ERR S 09 1 29 07 1994 199 count 7 1 I(0,0,1,N)

6. collector: paging.sh produces the following SM records:

PS <paging space> size

PS <paging space> amount

PS <paging space> active

PS <paging space> locPV

PV <paging space> npaging

PV <paging space> spaging invokes the following RM APIs:

date lsps −a

Examples

PS hd6 09 1 29 07 1994 199 size 64 1 I(0,0,1,MB)

PS hd6 09 1 29 07 1994 199 amount 16 1 I(0,0,1,MB)

PS hd6 09 1 29 07 1994 199 active true 1 B

PS hd6 09 1 29 07 1994 199 locPV hdisk0 1 T

PV hdisk0 09 1 29 07 1994 199 npaging 1 1 I(0,0,1,N)

PV hdisk0 09 1 29 07 1994 199 spaging 64 1 I(0,0,1,MB)

7. collector: lsatrr.sh produces the following SM records:

SYS sys0 maxpout

SYS sys0 minpout

SYS sys0 memscrub

SYS sys0 maxuproc

SYS sys0 lopacing invokes the following RM APIs:

date lssatr −E −1 sys0 hostname

Examples

SYS sys0 09 1 29 07 1994 199 maxuproc 100 1 I(0,0,1,PROC)

SYS sys0 09 1 29 07 1994 199 maxpout 0 1 I(0,0,1,PAGES)

SYS sys0 09 1 29 07 1994 199 minpout 0 1 I(0,0,1,PAGES)

SYS sys0 09 1 29 07 1994 199 memscrub false 1 B

SYS sys0 09 1 29 07 1994 199 lopacing false 1 B 8. collector: processes.sh produces the following SM records:

PROCESS <process id> cpu1

PROCESS <process id> cpu2

PROCESS <process id> cpu3 invokes the following RM APIs:

date ps avcg

Examples

PROCESS 516 09 1 29 07 1994 199 cpu1 98.7 1 I(0,0,1,pct)

PROCESS 12760 09 1 29 07 1994 199 cpu2 0.5 1 I(0,0,1,pct)

PROCESS 1032 09 1 29 07 1994 199 cpu3 0.4 1 I(0,0,1,pct)

9. collector: network.sh produces the following SM records:

HOST <host name/address> loss

HOST <host name/address> avgping invokes the following RM APIs:

date netstat –F inet hostent –S namerslv –s –Z

Examples

HOST leperc.austin.ibm.com 09 1 29 07 1994 199 loss 100 1 I(0, 0,5,pct)

HOST ausvm6.austin.ibm.com 09 1 29 07 1994 199 loss 0 1 I(0, 0,5,pct)

HOST ausvm6.austin.ibm.com 09 1 29 07 1994 199 avgping 61 1 I(0,0,5,MS)

10. collector: workload.sh produces the following SM records:

WORKLOAD nusers value

WORKLOAD nprocesses value

WORKLOAD cp value

USER <userid> nprocs invokes the following RM APIs:

date uptime pc aucg timex ps avg

Examples

WORKLOAD nusers 09 1 29 07 1994 199 value 10 1 I(0,0,1,N)

WORKLOAD nprocesses 09 1 29 07 1994 199 value 81 1 I(2,2,10,PROCS)

USER root 09 1 29 07 1994 199 nprocs 47 1 I(2,2,10,PROCS)

USER nthomas 09 1 29 07 1994 199 nprocs 1 1 I(2,2,10,PROCS)

USER jimp 09 1 29 07 1994 199 nprocs 5 1 I(2,2,10,PROCS)

WORKLOAD cp 09 2 29 07 1994 200 value 0.025 1 I(0,0,10,S)

11. collector: cpu.sh produces the following SM records:

SYS sys0 uptime invokes the following RM APIs:

date uptime

Examples

SYS sys0 09 1 29 07 1994 199 uptime 205860 1 I(0,0,1,S)

12. collector: vmm.sh produces the following SM records:

SYS sys0 VMM_lctl_SUM

SYS sys0 VMM_lctl_SUMSQ

SYS sys0 VMM_lctl_EXCEPTIONS invokes the following RM APIs date

/dev/kmem/(via pgm getschedparms)

vmstat 1 301

Examples

SYS sys0 09 1 29 07 1994 199 VMM_lctl_SUM 0 1 I(1,1,300, ratio)

SYS sys0 09 1 29 07 1994 199 VMM_lctl_SUMSQ 0 1 I(1,1, 300,ratio)

SYS sys0 09 1 29 07 1994 199 VMM_lctl_EXCEPTIONS 0 1 I(1,1,300,N)

Many other commands can be used by PDS 200 to collect the various data.

RETENTION CONTROL UNIT 208

Figure 4:
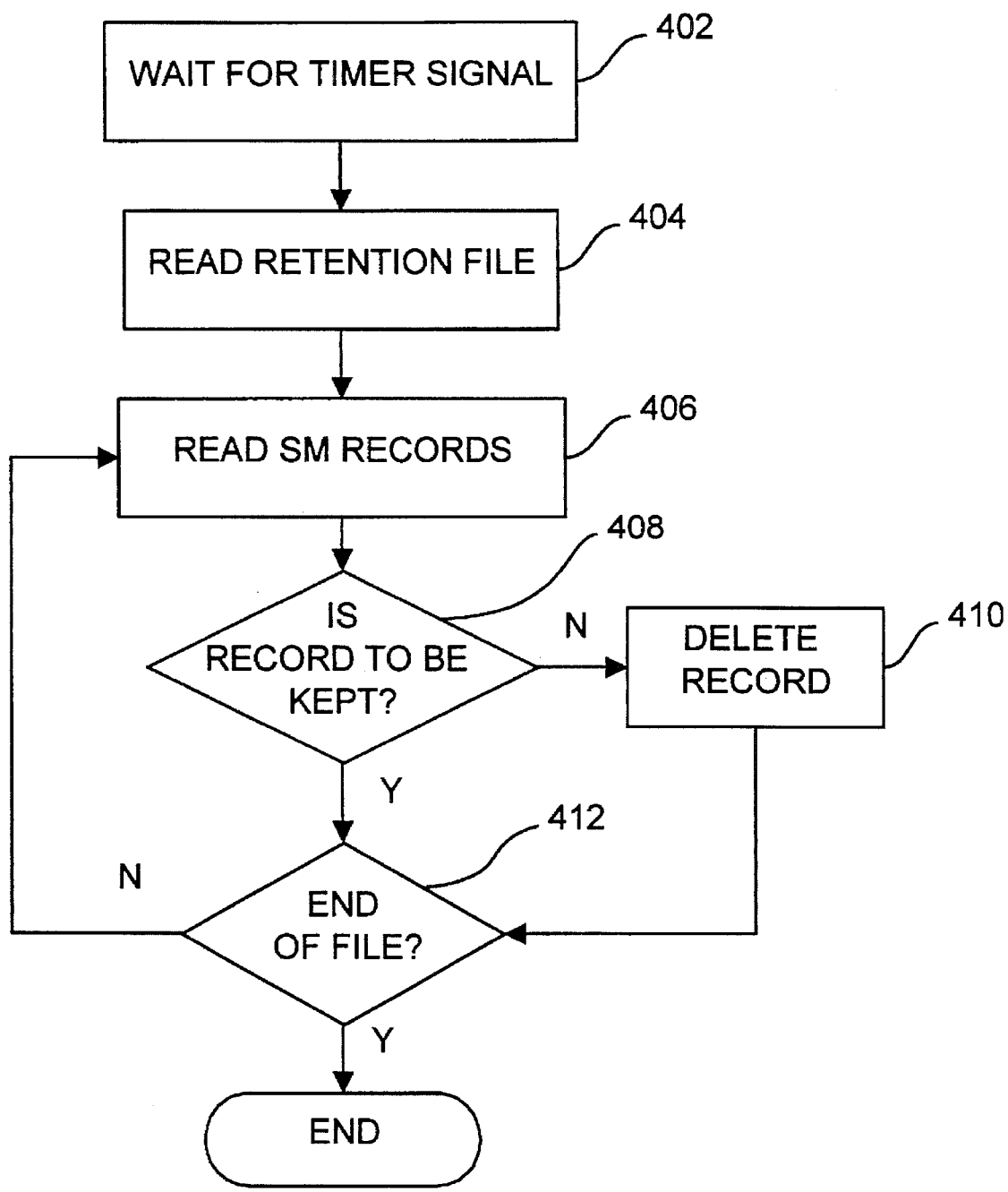
FIG. 4 is a flow chart of the operation of a retention unit of the PDS of FIG. 2.

Periodically, a retention program is run that discards entries in the SM database deemed to be too old. Referring now to FIG. 4 what is shown is a flow chart of the operation of the retention control unit 208. Retention unit 208 waits for signal from timer 214 via step 402. The retention file is then read via step 404. Then the SM records are read via step 406. Next, for each SM record, a determination is made as to whether the SM record is to be kept via step 408. If a record is to be kept, then it is determined if the record is the end of the file via step 412, if the record is the end of the file then the process ends. If the record is not the end of file then return to step 406. If the record is not kept, then delete the file via step 410 and proceed to step 412.

Retention is controllable on a <type, attribute, rectype> basis and is indicated in a retention file.

The format of the retention file is:

type attribute rectype Ndays where matching type/attribute/rectype SM records can be identified explicitly, or by wildcarding any of the type/attribute/rectype fields.

The retention control unit 208 discards all records in the SM file that are older than the designated retention period. If no retention guidelines are found in the retention file for a particular record, then a default retention period of a predetermined time period is utilized.

CONTROL UNITS 210 and 212

Collection, Retention and Reporting control units 208, 210, 212 are all driven by the same program from a set of timer 214 programs. In a typical UNIX system this program is identified as the cron program. At installation time, several timer entries are created that call the Driver.sh shell program. The single parameter identifies each call with a unique frequency. For example, consider the following timer 214 table entries in a Unix based system:

| | |
|---|---|
| 0 9 * * 1–5 | /usr/lbin//perf/diag_tool/Driver.sh daily |
| 0 10 * * 1–5 | /usr/lbin/perf/diag_tool/Driver.sh daily2 |
| 0 21 * * 6 | /usr/lbin/perf/diag_tool/Driver.sh offweekly |

These will cause the control program to be run once a week day at 9:00 am (with parameter string 'daily'); once a week day at 10:00 am (with parameter string 'daily2') and every Saturday evening at 9:00 pm (with parameter 'offweekly').

The control program in turn calls each of the Collection, Retention and Reporting control units 208, 210, and 212, passing the frequency parameter. Collection, Retention and Reporting actions with matching frequencies are then run. Below is a sample Collection control file in a Unix based system. Each of the collectors 206 is run at the same frequency, 'daily' (of course, the actual frequency depends on the times associated with the 'daily' call to the control program in the timer 214 table):

| | |
|---|---|
| fn.sh | daily |
| fs.sh | daily |
| pv.sh | daily |
| mem.sh | daily |
| err.sh | daily |
| paging.sh | daily |
| lsattr.sh | daily |
| processes.sh | daily |
| network.sh | daily |
| workload.sh | daily |
| cpu.sh | daily |
| vmm.sh | daily |

Below is a sample Retention control file. The retention script is run off-weekly (in this case, 9 pm on Saturdays).

| | |
|---|---|
| retention.sh | offweekly |

Below is a sample Reporting control file. In this case, the reporting script is run daily at 10 am.

| | |
|---|---|
| report.sh | daily2 |

Note that this system allows the collectors 206, retention control 208 and reporter 204 to run at different frequencies. This system also allows for relatively simple modifications of the frequencies at which collection, retention and reporting actions are to occur. In the preferred embodiment, only one user's timer 214 table (e.g. the admin user on a UNIX system) is able to drive collection, retention and reporting.

REPORTER 204

Figure 5:
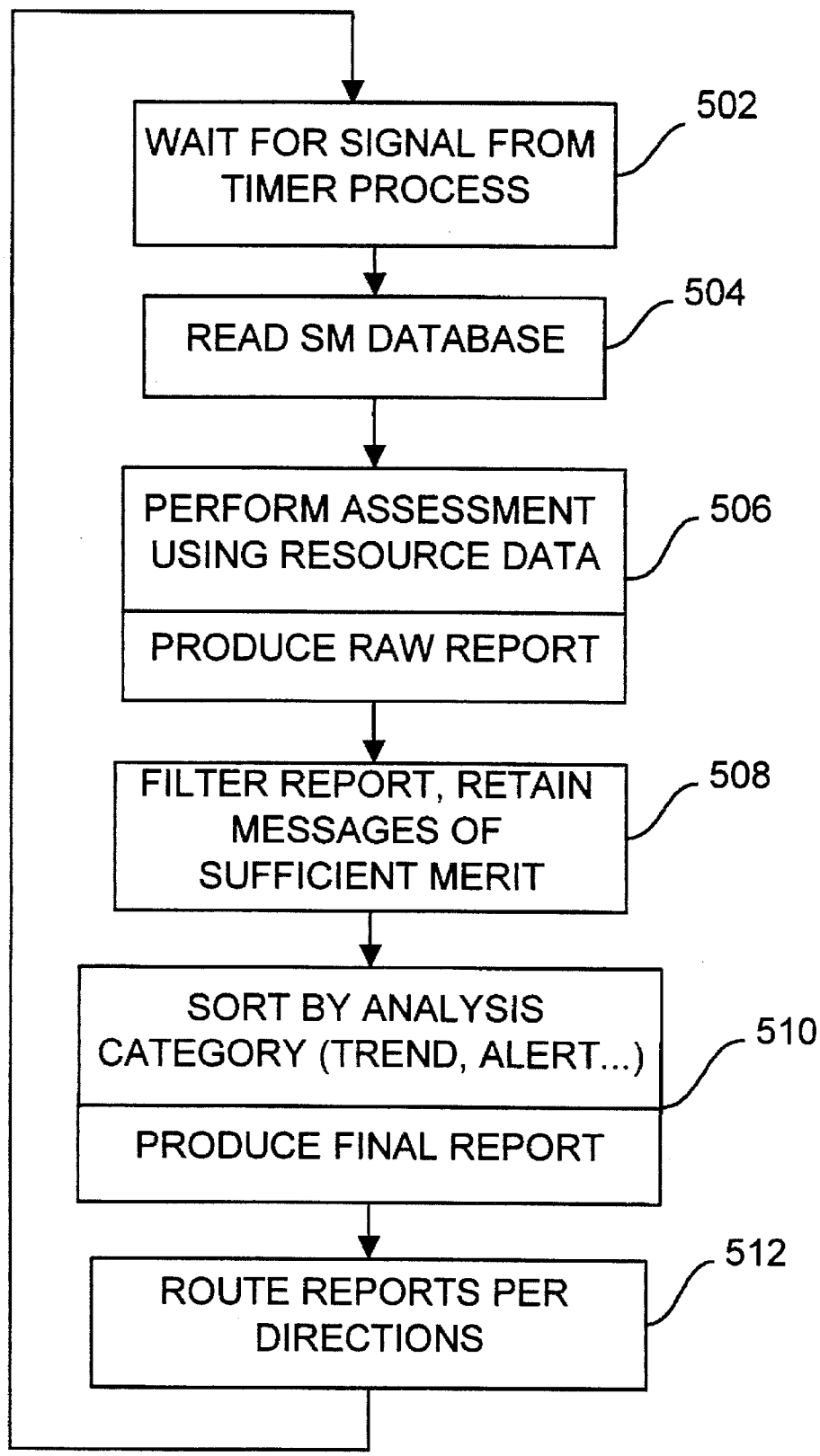
FIG. 5 is a flow chart of operation of a reporter of PDS of FIG. 2.

Reporting is performed periodically. The report writer program reads the SM database and produces a raw report, which is then post-processed yielding a final report. To describe the operation of the reporter 206 refer now to the flow chart of FIG. 5. As is seen in the flow chart, the reporter 204 waits for a signal from timer 214 via step 502. The reporter 206 then reads the SM data via step 504. The reporter performs various assessments and produce a raw report via step 506. These various assessments will be described later in this specification. Thereafter, the report is filtered via step 508. After sorting and analysis by category a final report is produced via step 510. Finally the report is routed in the appropriate manner via step 512.

In a UNIX type system the raw report is written to a particular file. The final report is written to a different file, as well as being e-mailed to the user. An alternative mechanism in a UNIX type system for obtaining a report is also available. By executing a particular program, a copy of the report using the latest measurement data is produced and written.

THE FINAL REPORT

The final report is produced for a specific severity level. The user picks a severity level to produce a particular report. The final report can be organized into sections such as:

1. The header (date, system id, etc.)
2. Alerts
3. Upward Trends
4. Downward Trends
5. System Health Indicators

REPORT CONTENT

The reporter 206 considers various aspects of system configuration and performance. Further, the result of each specific assessment is given a (fixed) severity. When the final report is produced from the raw report, a severity threshold can be input that will be used to filter the raw report's contents.

Several general techniques are used in evaluation. Many of these techniques are utilized to evaluate the performance of the computer system 10. These assessments include but are not limited to BALANCE, OUT-OF RANGE, CONFIGURATION ANOMALY, and TRENDING. These assessments are utilized in the production of a final report. The outcome of each assessment describe what the assessment is, the indication of the status of the assessment and the severity level (level 1, 2 or 3).

Note that, below, we show only the highest severity associated with any particular condition. It is frequently the case that following the identification of a severity X condition, additional severity X+1 messages are output. (For example, the appearance of a new process as consuming a significant portion of the cpu process is a severity 2 message. Accompanying this message is a severity 3 message indicating the actual amount of cpu consumed by the new cpu process. Only if the reporting severity is set to 3 will both messages be visible.)

The next few sections describe many of the types of assessments that can be made by the reporter 206 of the PDS 200. The list is not exhaustive but describes some assessments that would be useful in diagnosing the performance of the computer system.

BALANCE ASSESSMENT

Figure 6:
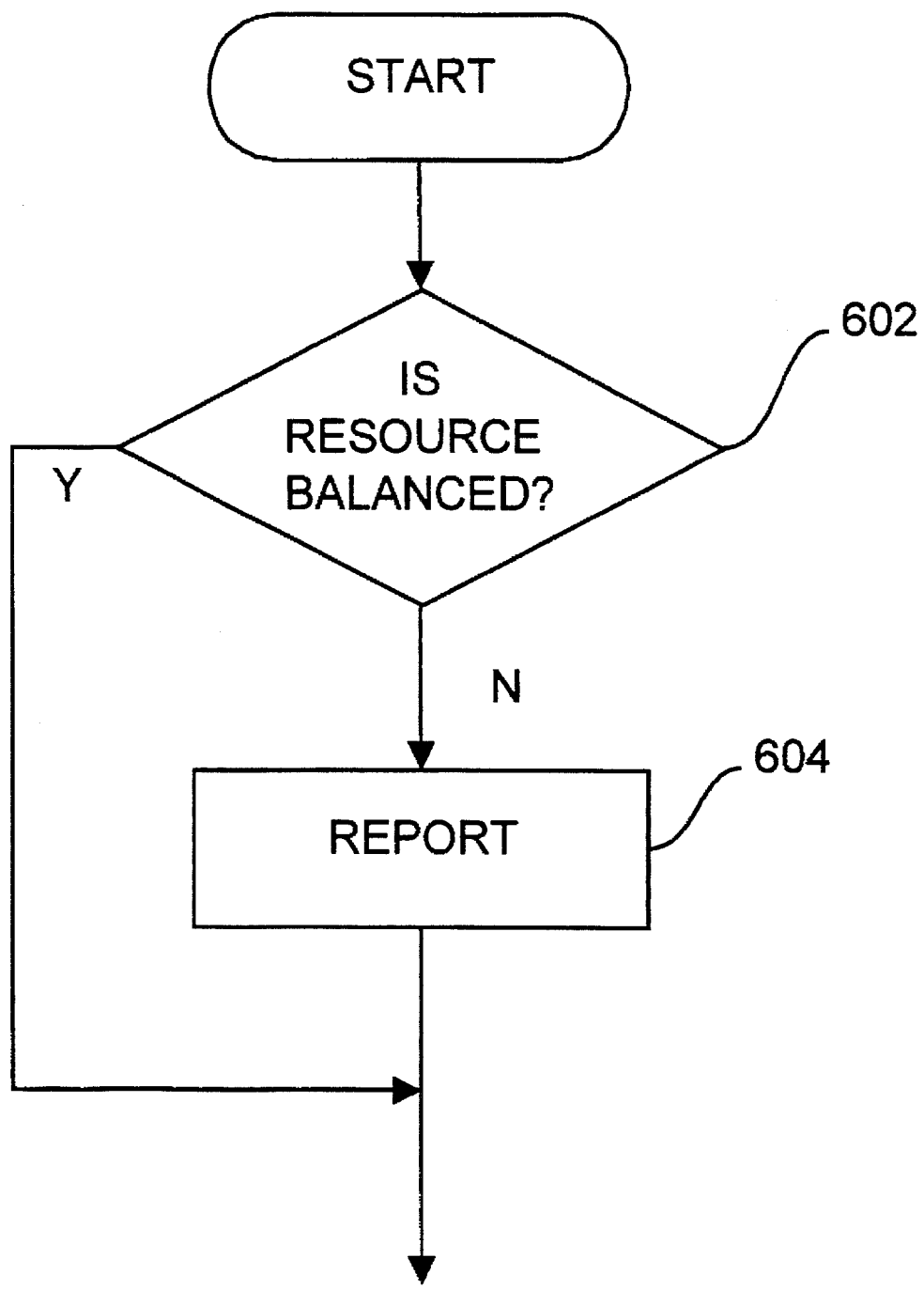
FIG. 6-13B are flow charts for providing assessments of a variety of elements utilized in the PDS of FIG. 2.

In general, balanced configurations and balanced use of multiple like-resources perform better than imbalanced ones. Therefore, the balance of various aspects of the system are considered. Referring now to FIG. 6 what is shown is a flow chart of a balance assessment. Accordingly it is determined if a measured characteristic of a resource, such as its use, allocation or configuration is balanced via step 602. If it is not balanced then a report is generated. The following shows some typical examples of different balance assessments for different resources.

1. The number of physical volumes or disks should be within
   NUMBER_OF_BALANCE of each other.
   ALERT
   SEVERITY 2
2. The amount of storage (e.g., disk capacity) on control units should be within DISK_STORAGE_BALANCE megabytes of each other.
   ALERT
   SEVERITY 2
3. The amount of available storage on each disk should be balanced.
   ALERT
   SEVERITY 2
4. The number of paging spaces on each physical volume should be balanced (i.e., within NUMBER_OF_ BALANCE of each other).

ALERT
SEVERITY 2
5. The size of each paging space should be the same.
ALERT
SEVERITY 2
6. The busiest disk is compared with the other physical volumes to see if its load is statistically greater. If so, then this busiest physical volume is identified. This is a simple assessment of dynamic I/O imbalance.
ALERT
SEVERITY 2

OUT OF RANGE ASSESSMENT

Figure 7:
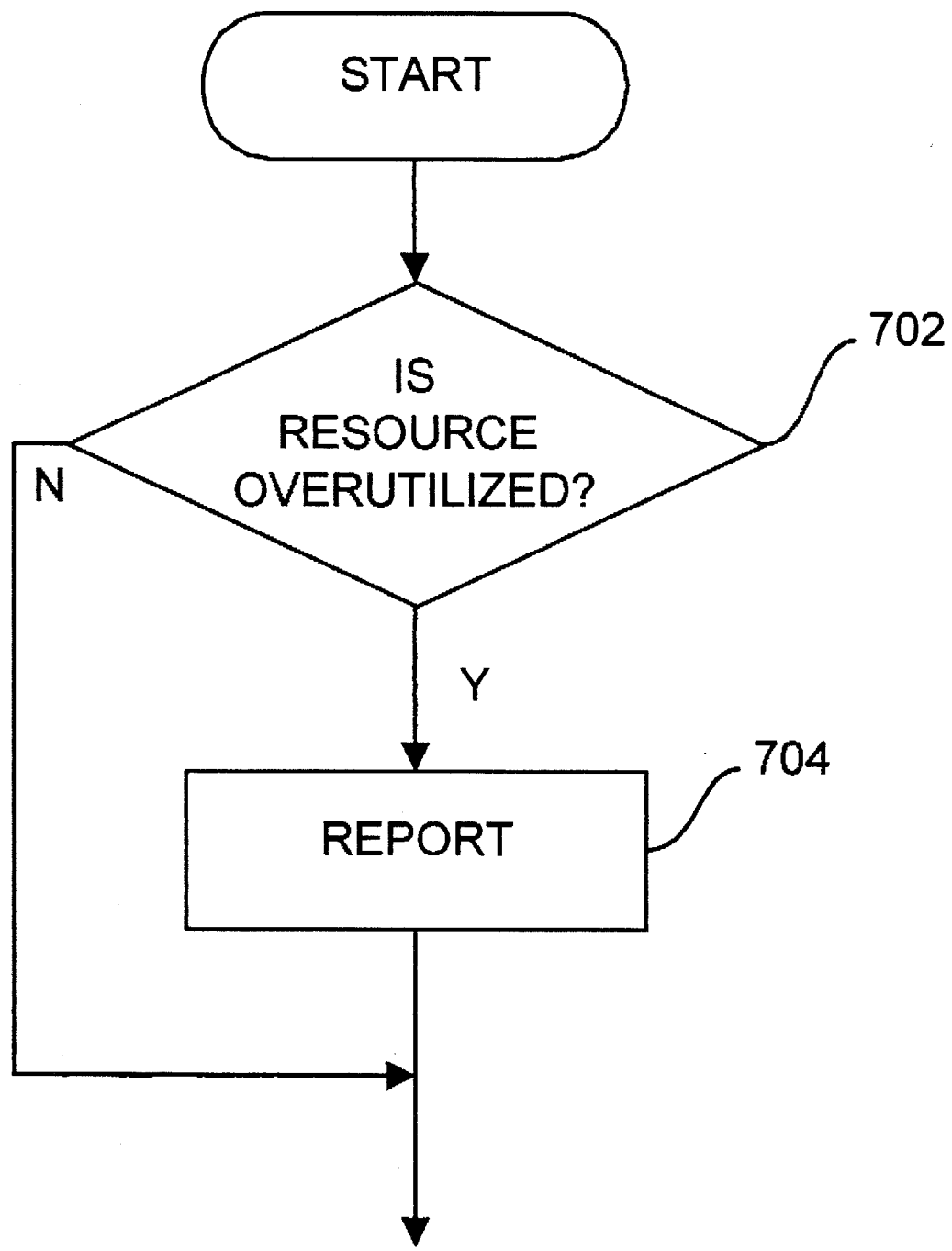

Referring now to FIG. 7 what is shown is a flow chart of an out-of-range assessment. Accordingly it is determined if a resource is overutilized via step 702. If the resource is overutilized then a report is generated via step 704.

The following shows some typical examples of different out-of-range assessments for different resources.
1. The utilization (storage) of all file systems is compared to FS_UTIL_LIMIT. If greater, then an alert is indicated.
ALERT
SEVERITY 2
2. The utilizations (storage) of all page spaces is compared to FS-UTIL_LIMIT. If greater, then an alert is indicated
ALERT
SEVERITY 2

CHANGES IN PROFILE ASSESSMENT

Figure 8:
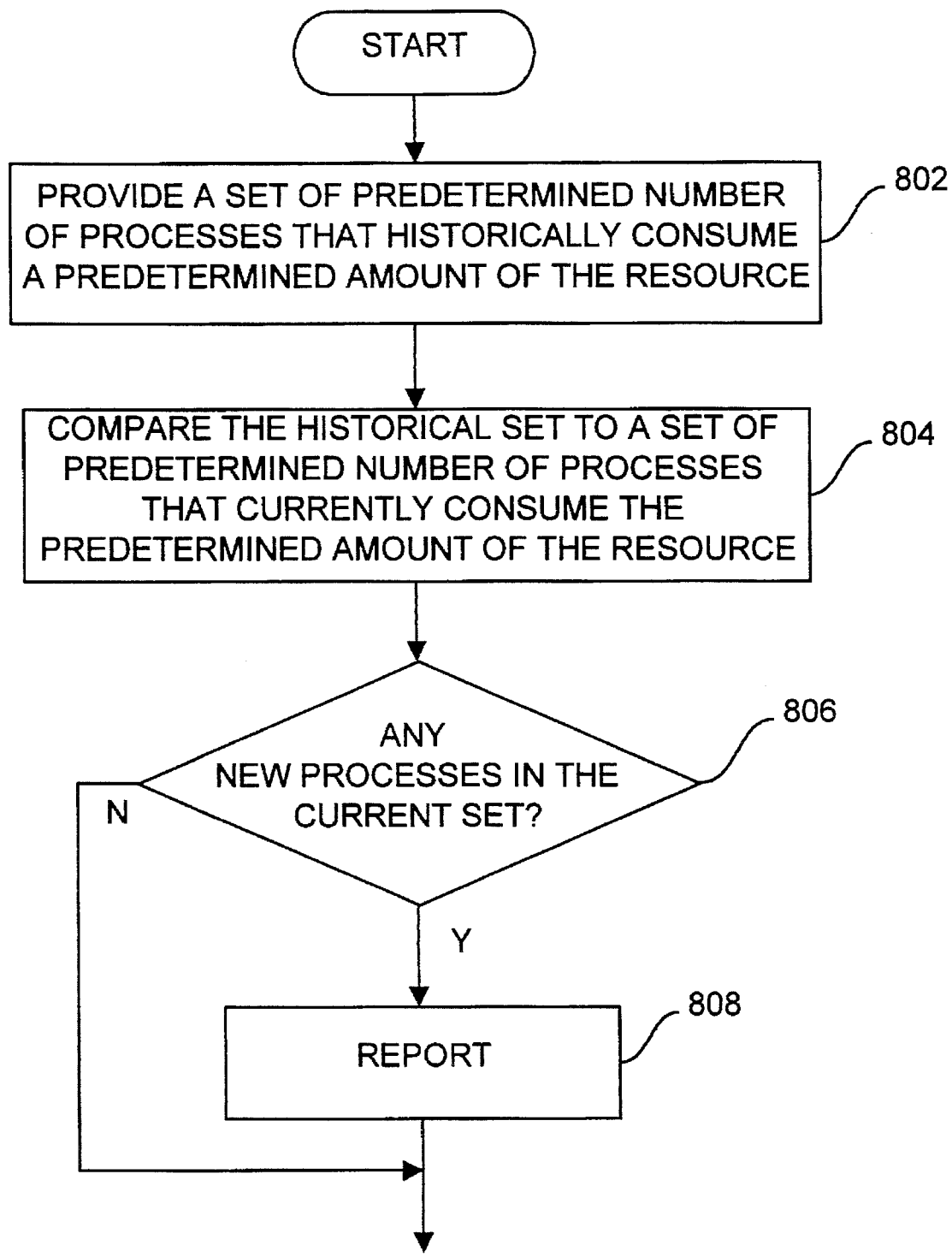

Referring now to FIG. 8 what is shown is a flow chart of a Changes In Profile Assessment. A set of predetermined number of processes (for example, the top three processes) that historically consume a predetermined amount of resources are provided via step 802. Thereafter the historical set is compared to a set of predetermined number of processes that currently consume the predetermined amount of resources via step 804. Then, a determination is made as to whether there are any new processes in current set via step 806. If there are new processes then a report is generated via step 808.

The following shows some typical examples of different changes in profile assessments for different resources.
1. The top-3 cpu and top-3 memory consuming processes are identified. They are compared to the top-3 cpu and memory consumers in the historical data. If any new processes are identified, and their utilization exceeds MIN_UTIL (default 3%), then an alert is indicated.
ALERT
SEVERITY 2
2. An approximate profile of waiting processes is produced. The profile provides a breakdown of the number of processes sleeping, waiting for or running on the cpu, waiting for paging, waiting for disk i/o, etc.
SYSTEM HEALTH
SEVERITY 2

CONFIGURATION ANOMALY ASSESSMENT

Figure 9:
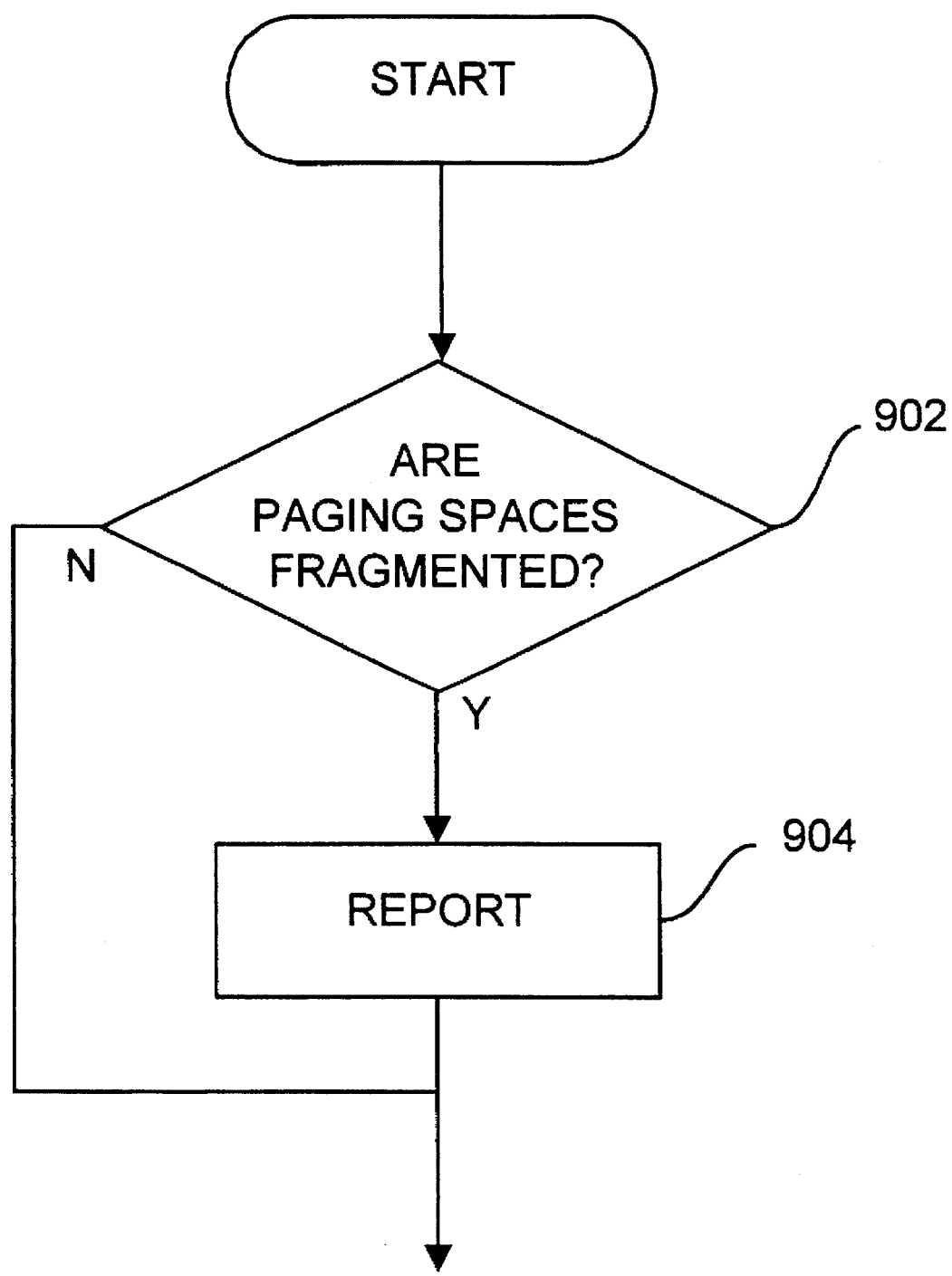

1. Paging spaces cad be fragmented into non-contiguous clumps of physical partitions on a volume. This is undesirable (since it means that page fault time will also involve more disk seek activity). Referring to FIG. 9 fragmented situations are identified via step 902, and a report is generated via step 904.

Figure 10:
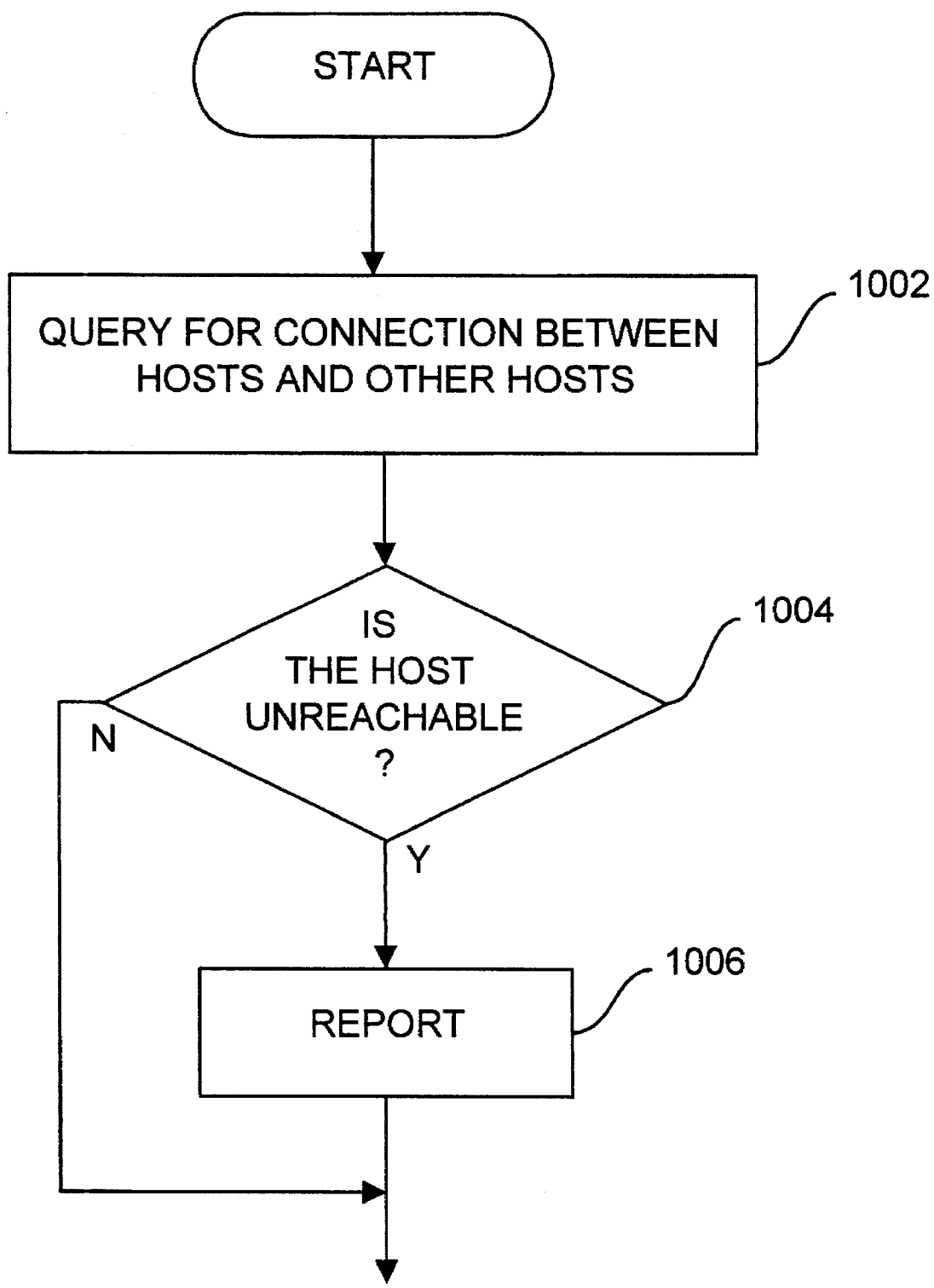
Figure 11:
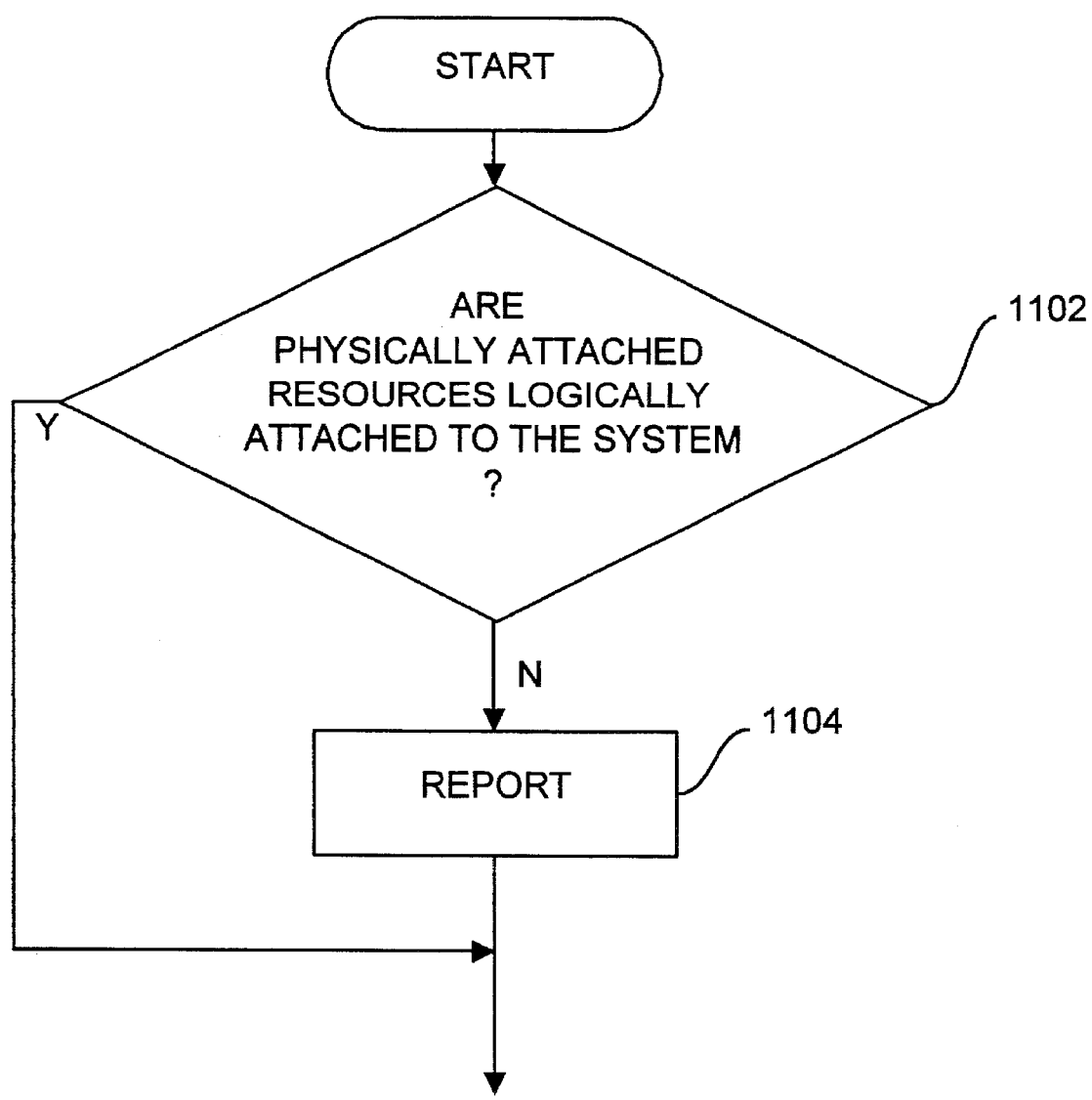
Figure 12:
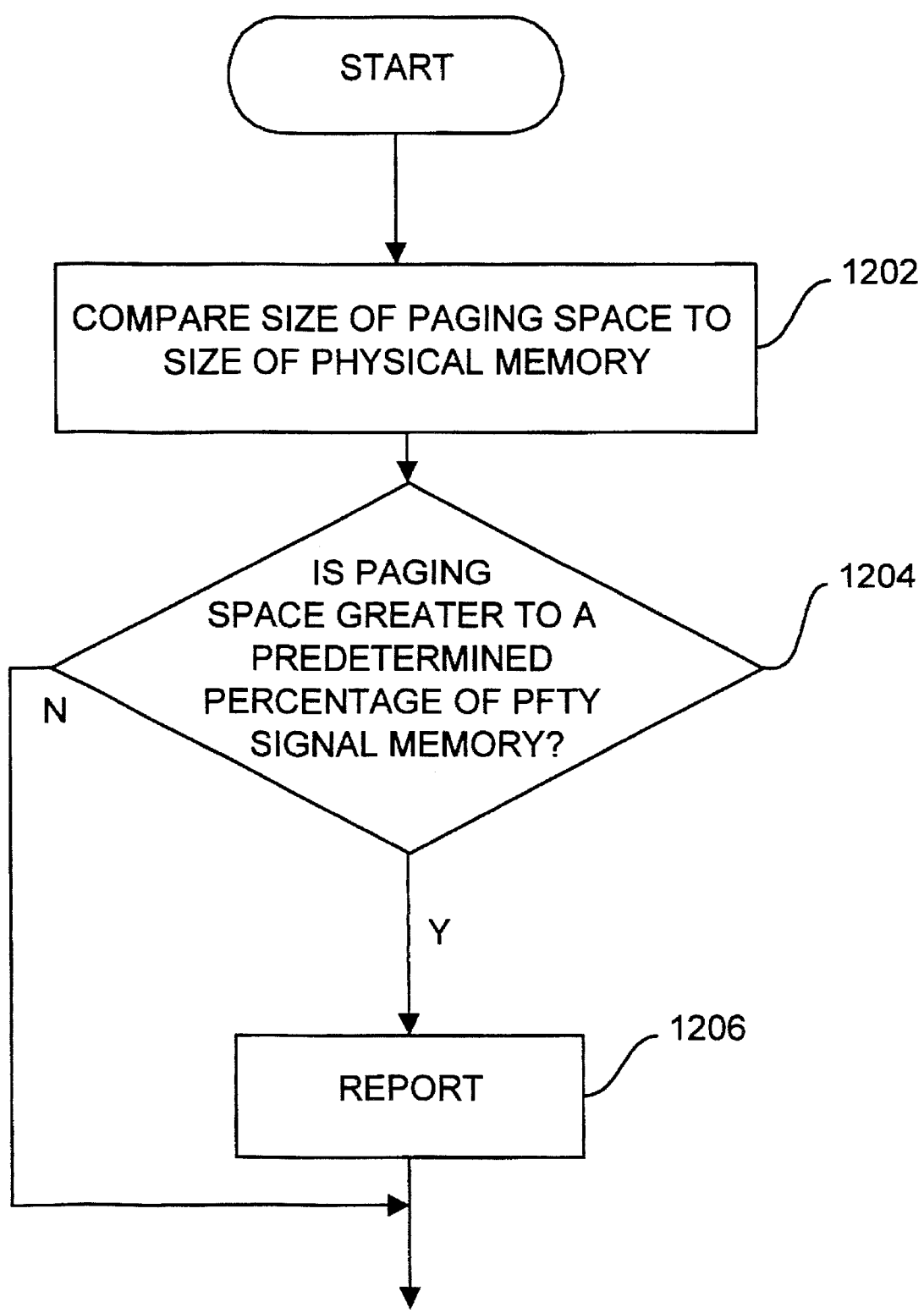

ALERT
SEVERITY 2
2. Referring to FIG. 10, connection between this host and others is queried (using a command) via step 1002, and any hosts that appear to be unreachable are identified as such via step 1004 and a report is generated via step 1006.
ALERT
SEVERITY 2
3. Referring to FIG. 11, resources are examined to ensure that they are logically attached to the computer system via step 1102. If they are not, then a report is generated via step 1104.
ALERT
SEVERITY 1
4. Referring to FIG. 12, the amount of physical memory is compared to the amount of used page space via step 1202. If used page space (also known as active virtual memory) is greater than a predetermined percentage of the physical memory, a report is generated indicating that more memory is needed via step 1204.
ALERT
SEVERITY 1

TREND ASSESSMENT

Trending assessment i s done extensively in PDS 200. Individual metrics relating specific resource usage are selected over a historical period. The reporter 204 makes a query to the SM database 202. Associated with each metric is a timestamp, $T_i$ and a value, $V_i$. To identify a trend, first fit the following simple model:

$$V_i = V_o + s * T_i$$

That is, find the straight line that best fits the data, when plotted with $T_I$ on the x-axis and $V_i$ on the y-axis. The slope of that line, s, will be the trend (or rate of growth) in the metric. If the metric being tracked has a maximum (or threshold value associated), then the time at which the threshold will be reached is estimated as $(Z-v_o)/s$, where Z is the given threshold.

Figure 13A:
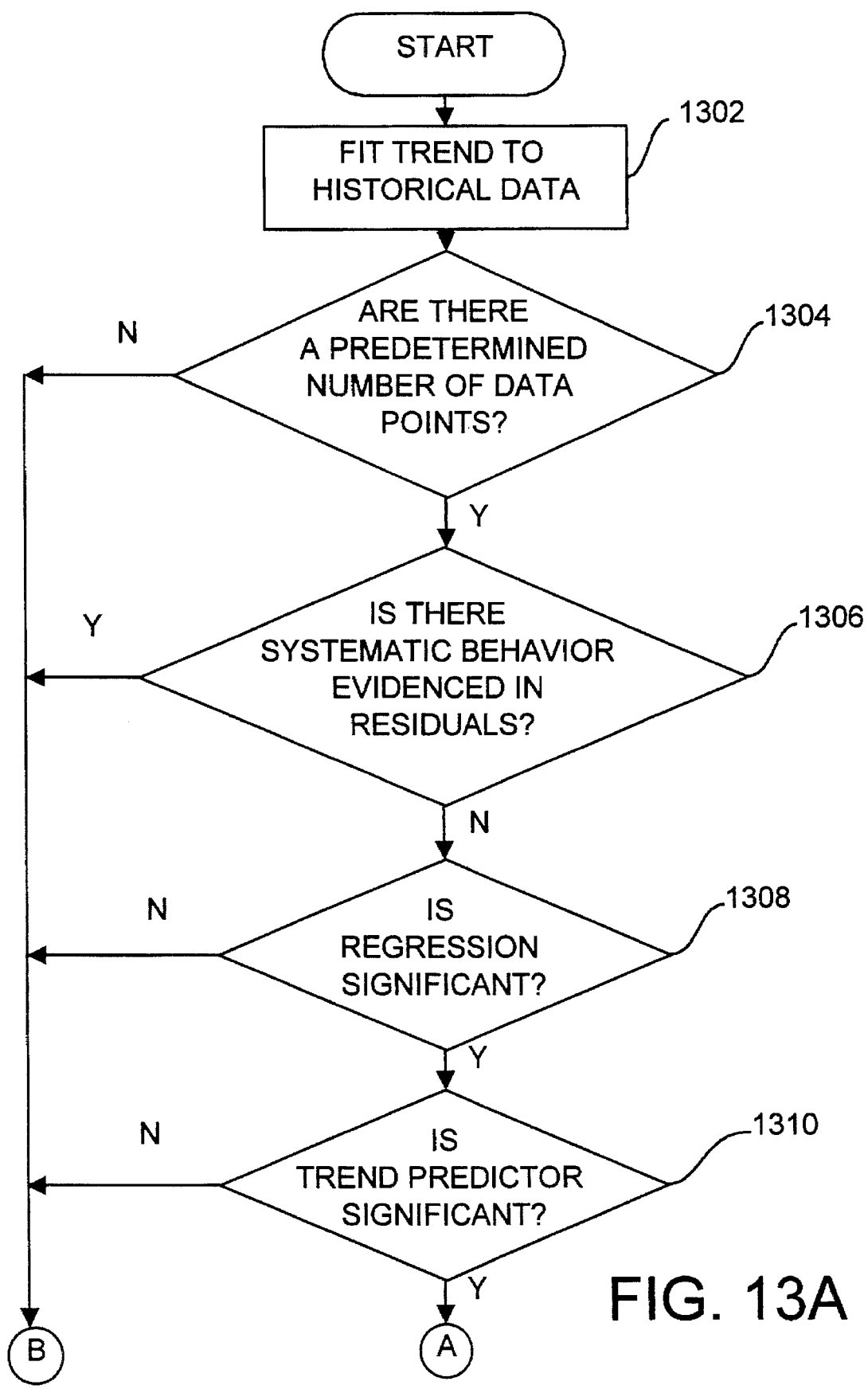
Figure 13B:
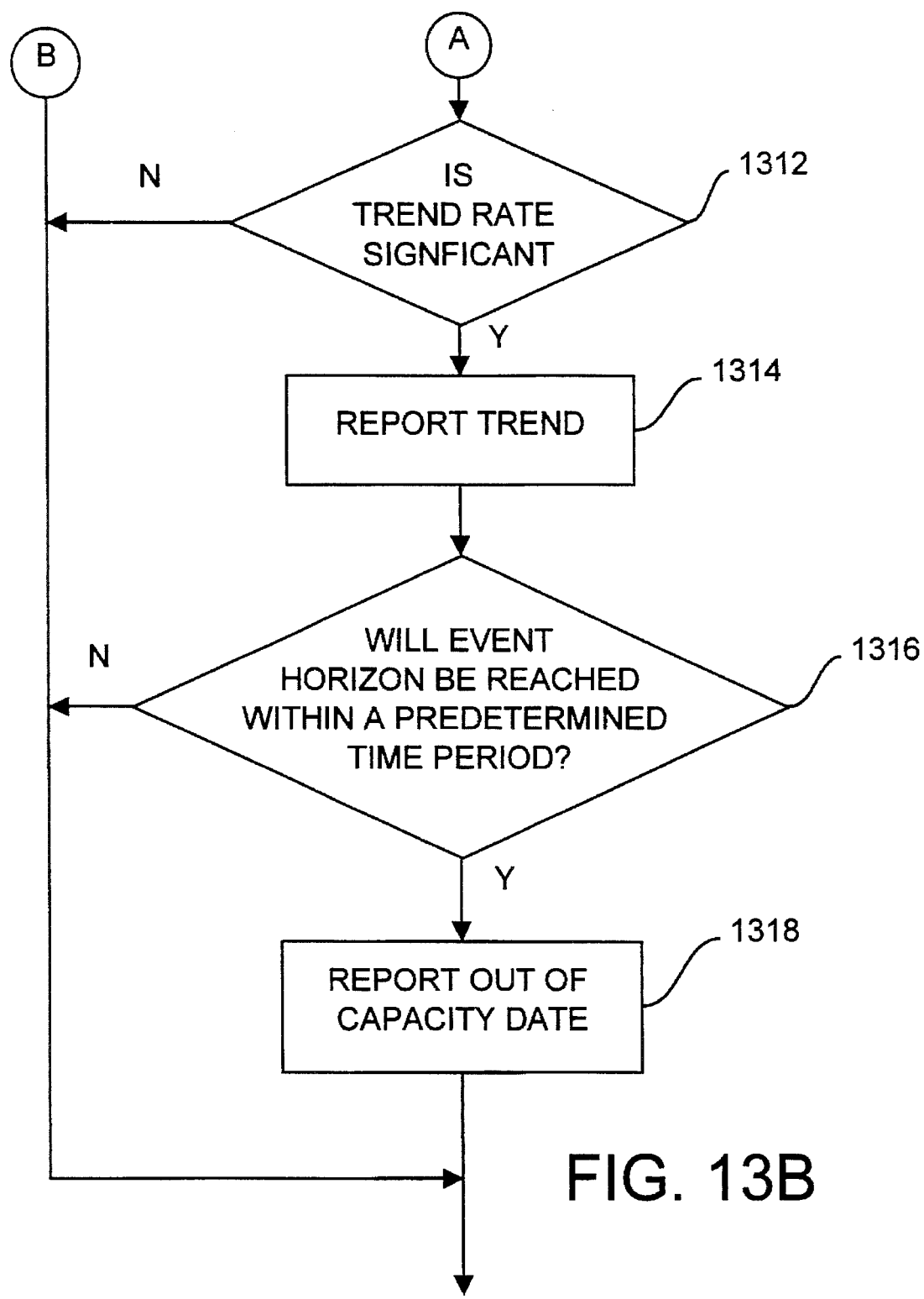

Referring to FIGS. 13A and 13B what is shown is a flow chart showing the generation of a trend assessment report. First, a trend line is fitted to the historical data via step 1302. It is always possible to fit such a line, so some further analysis is required to determine how well the fitted model describes the data (a good fit is critical for inferring the existence of a trend). Several statistical tests are employed to reduce the likelihood of a 'false positive' identification of trend.

First, trend analysis is performed only if predetermined number (e.g., at least 3) of data points are available via step 1304.

Second, the residuals from the regression are analyzed for systematic behavior via step 1306. [Note that the residuals are determined by taking the difference between each measured value, and each value as predicted by our fitted line.] If there is systematic behavior there is likely a poor linear fit—therefore, no trend would be identified via step 1306. There are two types of residual analysis performed:
  (1) Runs test: The residuals are examined for runs. A run is a sequence of residuals having the same sign (e.g., all positive or all negative). The largest such run is identified and its length is noted. The probability of such a run occurring given N independent samples is determined. A technique is shown below: The probability of a run of length i in N independent data points is approximately $1.0-(1.0-0.5^i)^{N-i+1}$. If the largest run (of all positives or all negative residuals) has probability of occurrence <0.05 (i.e., it is unlikely that the sequence is due to random chance) we reject the fit and indicate no trend.

2. Distribution of the residuals: Given N residuals, there should be no particular bias toward positive (or negative) values. That is, we expect about half the residuals to be positive, and half negative (in making this assessment, we ignore all residuals sufficiently close to zero). We count the number of positive, and negative residuals, and determine whether or not this observed value indicates an unlikely bias. If it does, then the fit is deemed unacceptable, and no trend is indicated. The technique is described below. Given N residuals the problem is to determine if the number of positive and the number of negative residuals is balanced. Assume there are j positive residuals (there will be N–j negative residuals). Assume, without loss of generality that j>N–j. Compute the probability of j or more residuals being positive. This is:

$$P = \sum_{i=j}^{N} .5^i \times .5^{N-i} \times \binom{N}{i}$$

$$\text{where } \binom{N}{i} = \frac{N!}{(N-i)!i!}$$

$$\text{e.g. } \binom{10}{3} = \frac{10!}{7!3!} = \frac{10 \cdot 9 \cdot 8 \cdot 7 \cdot 6 \cdot 5 \cdot 4 \cdot 3 \cdot 2 \cdot 1}{7 \cdot 6 \cdot 5 \cdot 4 \cdot 3 \cdot 2 \cdot 1 \cdot 3 \cdot 2 \cdot 1} = 120$$

If P is very small (<0.05) we reject the fit and report no trend. For situations in which N is large (>30) we use a normal approximation to the Binomial shown above.

Thereafter statistical significance of the regression is considered via step 1308, as is the statistical significance of the trend predictor (s, the slope) via step 1310. (The statistical significance of linear regression is described in many statistics texts, e.g., Applied Regression Analysis, Second Edition, Draper & Smith, Wiley-Interscience, 1981.)

The practical significance of the fitted trend is next assessed. This is done in two stages. First, the rate of the trend is compared to a threshold via step 1312 to determine if it is large enough to warrant reporting. The daily trend (s) is normalized by the last measured value (current_value) and compared to a certain percentage (TREND_THRESHOLD). If it exceeds this percentage, the trend is considered practically significant, and a report of the existence of that trend is made in step 1314. In particular, the determination is as follows:

if (s/current_value)>TREND_THRESHOLD then report trend as significant

A typical value for the TREND_THRESHOLD is 0.01. For example, if the daily rate is 0.5, the current value is 1, and the TREND_THRESHOLD is 0.01, then the trend would be considered significant. Had the current value been 100, a daily rate of would have been considered insignificant.

The second stage of practical significance assessment is indicated in step 1316o Some metrics have well known thresholds (e.g., metrics indicating absolute resource capacity typically have a ceiling of 100%), and employing trend detection on those metrics can provide an estimate of when the corresponding resources will reach their capacity.

In such cases, it is desirable to report the time at which such a capacity limit will be reached. However, if, for example, the detected trend in such a metric indicates that the ceiling will be reached in 6 months, then this information may not be very interesting. To deal with this possibility, an additional threshold is employed for controlling whether or not it is appropriate to identify 'out of capacity' dates. [Note that this assessment has no bearing on the presence/ significance of the trend. Here the only concern is whether or not the 'out of capacity' date is of interest.] If the event horizon will be reached within a predetermined time period (e.g. 20 days) then an additional out-of-capacity report is generated via step 1318.

The following areas are considered important for trend assessment:

1. The central processing unit (cpu) consumption of the most recent top-3 cpu-using processes.
   UPWARD or DOWNWARD TREND
   SEVERITY 2
2. The memory consumption of the most recent top-3 memory-using processes.
   UPWARD or DOWNWARD TREND
   SEVERITY 2
3. The size of files named in the important files and directories (e.g. /tmp in Unix).
   UPWARD or DOWNWARD TREND
   SEVERITY 2
4. The size of all file systems, together with a prediction of the time at which they will fill (if there is an upward trend).
   UPWARD or DOWNWARD TREND
   SEVERITY 2
5. The sizes of paging spaces, together with a prediction of the time at which they will fill (if there is an upward trend).
   UPWARD TREND
   SEVERITY 2
6. The number of hardware or software errors. Average error rates are estimated.
   UPWARD TREND
   SEVERITY 2
7. The delays of workloads for which response times are recorded. (These are workloads collected by the workload.sh collector).
   UPWARD TREND
   SEVERITY 2
8. The packet loss percentage to any host reachable from this host.
   UPWARD TREND
   SEVERITY 2
9. The average ping delay to any host reachable from this host.
   UPWARD TREND
   SEVERITY 2

Conclusion

Accordingly, with a performance diagnosis system 200 in accordance with the present invention the existence of a performance problem will be reported. Various assessment can also be made that also will help solve problems associated with performance of the computer. The reports generated by the PDS 200 will provide a list of detected and suspected performance problems. The PDS 200 can also be utilized to provide overall computer system health indicators as well as specific indicators of the condition of individual resources.

Although the present invention has been described in accordance with the embodiments shown in the figures, one of ordinary skill in the art recognizes there could be variations to the embodiments and those variations would be within the spirit and scope of the present invention. For example, although the present invention has been described in the context of a particular computer system (UNIX) one of ordinary skill in the art recognizes that a system in accordance with the present invention could be utilized in a variety of computer systems and its use would be within the spirit and scope of the present invention. Accordingly, many modifications may be made by one of ordinary skills in the art without departing from the spirit and scope of present invention, the scope of which is defined by the appended claims.

What is claimed is:

1. A method for providing an indication of the performance of a computer system; the computer system including an operating system, the operating system including a plurality of resource managers; the method comprising the steps of:
   (a) receiving data from the plurality of resource managers; each being coupled to a plurality of data collectors within the computer system; the data being received by
      (a1) requesting status information from the associated resource manager;
      (a2) collecting historical information from the associated resource manager;
      (a3) requesting a record; and
      (a4) sending the record to the database;
   (b) providing historical and configuration information responsive to the received data, a database including an application program interface for providing the historical and configuration information in a standard format;
   (c) providing a report of the performance of the computer system;
   (d) controlling information provided to the database;
   (e) controlling the reports generated; and
   (f) retaining configuration and historical information within the database for a predetermined time period by
      (f1) reading a retention file;
      (f2) reading records in the database; and
      (f3) determining if a record is to be kept in the database.

2. The method of claim 1 in which the copying step (f4) further comprises discarding the record if the record is not to be kept.

3. The method of claim 2 in which the report providing step (c) further comprises the steps of:
   (c1) reading the information data in the database;
   (c2) providing assessments of the computer system; and
   (c3) providing a report.

4. The method of claim 3 in which assessments providing step (c2) further comprises providing an out-of-balance assessment.

5. The method of claim 3 in which assessments providing step (c2) further comprises providing an out-of-range assessment.

6. The method of claim 3 in which assessments providing step (c2) further comprises providing a change in profile assessment.

7. The method of claim 3 in which assessments providing step (c2) further comprises providing a configuration anomaly assessment.

8. A performance diagnosis system (PDS) for providing an indication of the performance of a computer system; the computer system including an operating system, the operating system including a plurality of resource managers; the performance diagnosis system comprising:
   a plurality of collector means; each of the collector means being coupled to one of the plurality of resource managers for receiving data therefrom; wherein each of the collector means further comprises:
      means for requesting status information from the associated resource manager;
      means for collecting historical information from the associated resource manager;
      means responsive to the collecting means for requesting a record; and
      means for sending the record to the database;
   a database coupled to the plurality of collection means for providing historical and configuration information responsive to the received data, the database including an application program interface for providing the historical and configuration information in a standard format;
   reporter means responsive to the historical and configuration information from the database for providing a report of the performance of the computer system;
   collector control means coupled to the plurality of collector means for controlling information provided to the database;
   reporter control means coupled to the reporter means for controlling the reports generated by the reporter;
   retention control means coupled to the database for retaining configuration and historical information for a predetermined time period;
   wherein the retention control means includes:
   means for reading a retention file;
   means responsive to the retention file reading means, for reading records in the database;
   means responsive to the records reading means for determining if a record is to be kept in the database; and
   timing means coupled to the collector control, reporter control and retention control means for timing the operation of the plurality of collectors, the reporter and the database.

9. The PDS of claim 8 in which the record copying means further comprises means for discarding the record if the record is not to be kept.

10. The PDS of claim 9 in which the reporter comprises means for reading the information data in the database;
    means responsive to the database reading means for providing assessments of the system; and
    means responsive to assessments providing means for providing a report.

11. The PDS of claim 10 in which assessment providing means further comprises providing an out-of-balance assessment.

12. The PDS of claim 10 in which assessment providing means further comprises providing an out-of-range assessment.

13. The PDS of claim 10 in which assessment providing means further comprises providing a changes in profile assessment.

14. The PDS of claim 10 in which assessment providing means further comprises providing a configuration anomaly assessment.

15. A computer readable medium containing program instructions providing an indication of the performance of a computer system; the computer system including an operating system, the operating system including a plurality of resource managers; the program instructions comprising:

(a) receiving data from the plurality of resource managers; each being coupled to a plurality of data collectors within the computer system; the data being received by
  (a1) requesting status information from the associated resource manager;
  (a2) collecting historical information from the associated resource manager;
  (a3) requesting a record; and
  (a4) sending the record to the database;

(b) providing historical and configuration information responsive to the received data, a database including an application program interface for providing the historical and configuration information in a standard format;

(c) providing a report of the performance of the computer system;

(d) controlling information provided to the database;

(e) controlling the reports generated; and (f) retaining configuration and historical information within the database for a predetermined time period by
  (f1) reading a retention file;
  (f2) reading records in the database; and
  (f3) determining if a record is to be kept in the database.

* * * * *